United States Patent [19]

Abe

[11] 4,103,725
[45] Aug. 1, 1978

[54] CONICAL SPRING WASHER

[75] Inventor: Michio Abe, Kasugai, Japan

[73] Assignee: Kinoshita Seiki Kabushiki Kaisha, Kyoto, Japan

[21] Appl. No.: 736,187

[22] Filed: Oct. 27, 1976

[30] Foreign Application Priority Data

Oct. 28, 1975 [JP] Japan .................... 50-129706

[51] Int. Cl.² ............................................. F16B 39/24
[52] U.S. Cl. .................................................... 151/35
[58] Field of Search ...................... 151/35, 36, 37, 38, 151/41

[56] References Cited

U.S. PATENT DOCUMENTS

| 1,043,721 | 11/1912 | Prince | 151/38 |
| 2,037,586 | 4/1936 | Olson | 151/37 |
| 2,253,241 | 8/1941 | MacDonald | 151/37 |
| 2,624,128 | 1/1953 | Phillips | 151/35 |
| 2,943,661 | 7/1960 | Stern | 151/38 |
| 2,959,204 | 11/1960 | Rigot | 151/37 |
| 3,221,792 | 12/1965 | Poupitch | 151/38 |
| 3,352,344 | 11/1967 | Lanius | 151/38 |
| 3,628,584 | 12/1971 | Gutshall | 151/38 |

FOREIGN PATENT DOCUMENTS 994,694  8/1951  France .................... 151/35

Primary Examiner—Marion Parsons, Jr.
Attorney, Agent, or Firm—Wenderoth, Lind & Ponack

[57]        ABSTRACT

A conical spring washer is constituted by a conical spring washer body, a plurality of spaced lock pawls extending downward from the lower contacting surface of the body, and each of the lock pawls has a gradually sloped face in the tightening direction of a nut or the head of a bolt and a sharply sloped face in the loosening direction of the nut or bolt head.

4 Claims, 10 Drawing Figures

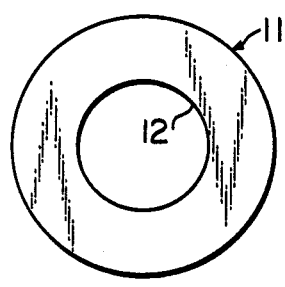
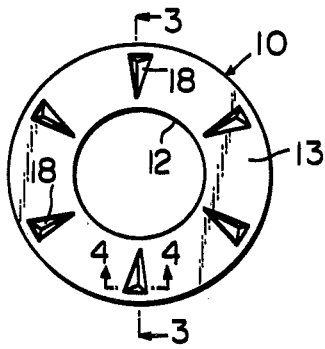
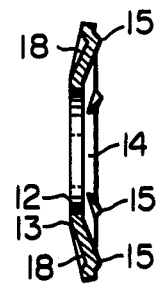
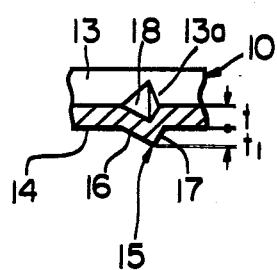
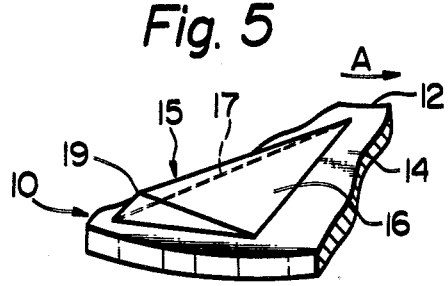
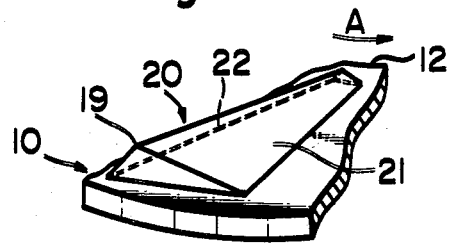

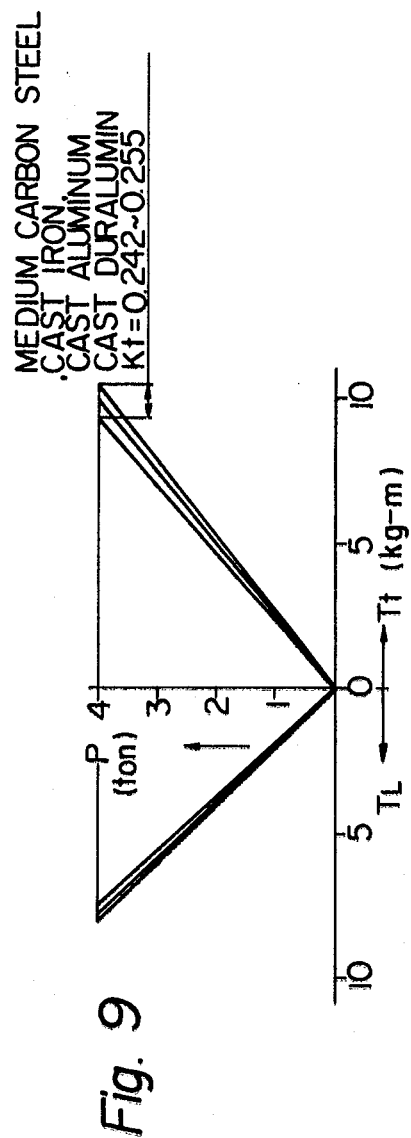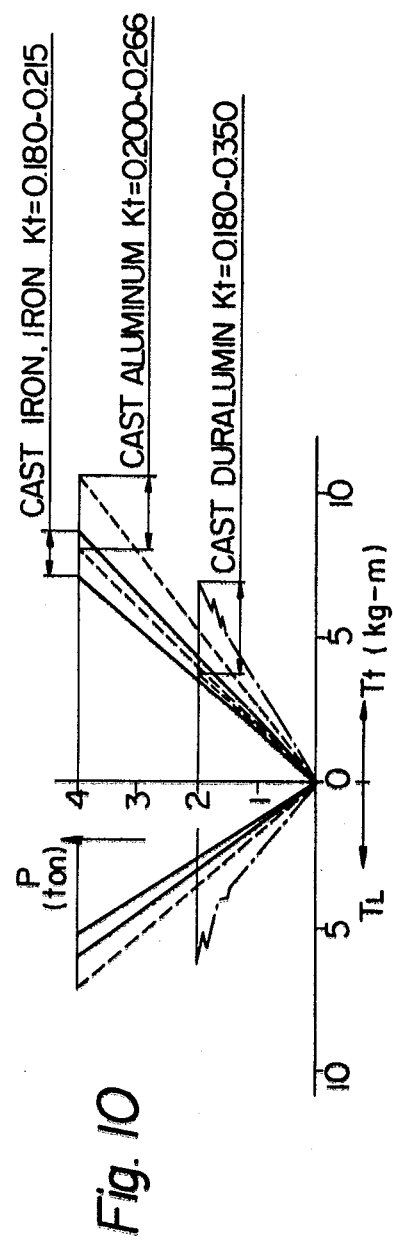

CONICAL SPRING WASHER

This invention relates to a conical spring washer to be used for tightening a bolt or a nut against a member to be tightened.

BACKGROUND OF THE INVENTION

For use as washers for bolts and nuts, a great variety of washers including standard plain, spring, wave, teethed and conical washers have been proposed and practically employed. However, these prior art washers have been found unsatisfactory with respect to practicability and cost.

The reason is that in the production of the conventional washers for such purposes, due and sufficient consideration has not been given to the absolutely necessary clamping force and proper bearing stress, which are essential for fastening means, and the technological basis on which a tightening torque required for satisfying such clamping force and bearing stress is determined, and also the simplification of the control of tightening.

Conventional bolts and nuts produced by proper facilities and with proper design would perform their expected functions as fastening means if they are tightened the proper control of tightening. However, the conventional tightening method of controlling the tightening of bolts and nuts complicated substantially because the torque to be designed for a bolt or a nut varies within a substantially wide range and very often depends upon the material of a heat-treatment performed on a member to be tightened, conditions on the contact faces of the bolt or nut and the member to be tightened and the co-rotation of the bolt or nut and a washer, if the latter is used.

Bolts and nuts as tightening means are required to be kept tight under all conditions, with no inadvertent loosening.

Although not usually considered as a serious matter, it is important that the tightening means, such as a bolt or a nut, under vibratory conditions is not under permanent strain at the area of its face contacting the member to be tightened.

In order to prevent the occurrence of this permanent strain, the area of the bearing surface of the bolt head or nut must be properly designed and provided according to variations of the member to be tightened.

For the above reason, it is necessary that a washer maintain a constant frictional resistance between the bearing surface of a bolt head or a nut and the upper contacting surface of the washer and between the lower contacting surface of the washer and the contact surface of the member to be tightened, respectively, regardless of the material of a member to be tightened. The washer must also have an area and a thickness to ensure a proper bearing stress with no slip between the lower contacting surface of the washer and the contact surface of the member to be tightened, respectively corresponding to variations of the necessary clamping force. If possible, the washer is further required to work for locking or provide a great frictional resistance in the loosening direction of the bolt or nut.

SUMMARY OF THE INVENTION

Therefore, one object of the present invention is to provide a conical spring washer which is relatively less expensive and is substantially simpler to construct.

Another object of the present invention is to provide a conical spring washer in which the so-called rotation angle method, which is not attracting a special attention as one of the bolt and nut tightening control methods, can be easily utilized.

Another object of the present invention is to provide a conical spring washer having on the lower contacting surface thereof a plurality of lock pawls which are adapted to bite into the adjacent face of a member to be tightened to prevent relative rotation between the washer and the member to be tightened and will not lose the tightening force provided by a nut or a bolt, even if a little loosening should occur between the member being tightened and the head of a bolt or the bearing surface of a nut due to any cause.

BRIEF DESCRIPTION OF THE DRAWINGS

The above and other objects and attendant advantages of the present invention will be more readily apparent to those skilled in the art from the following description when read in connection with the accompanying drawings, in which:

FIG. 1 is a plan view of the blank for a conical spring washer of the invention as stamped out of a thin steel hoop material;

FIG. 2 is a plan view of a complete conical spring washer of the invention processed from the blank of FIG. 1;

FIG. 3 is a cross-sectional view taken substantially along the line 3—3 of FIG. 2;

FIG. 4 is a fragmentary cross-sectional view on an enlarged scale taken substantially along the line 4—4 of FIG. 2;

FIG. 5 is a fragmentary perspective view on an enlarged scale as seen from the lower contacting surface of said washer showing one lock pawl of the washer;

FIG. 6 is similar to FIG. 5, but shows a modified lock pawl;

FIGS. 7 and 8 are views showing said washer in its different operative positions in which;

FIG. 7 is a side view showing said washer in a position before the washer is initially tightened;

FIG. 8 is a side view showing said washer in a position after the washer has been fully tightened;

FIG. 9 is a diagram of the torque-tension relationship for said washer; and

FIG. 10 is a diagram of the torque-tension relationship for a conventional flanged bolt.

DETAILED DESCRIPTION OF THE INVENTION

Figure 7:
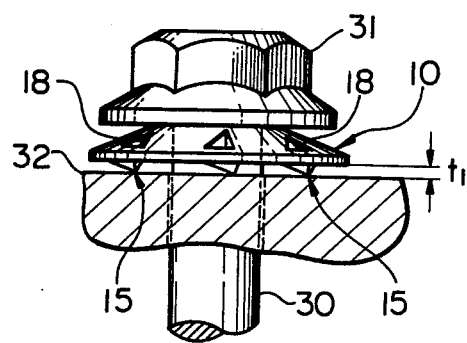

Referring to the accompanying drawings, and more particularly to FIGS. 1 through 5 thereof, a preferred embodiment of a conical spring washer according to the present invention is generally shown by reference numeral 10.

The conical spring washer 10 is prepared by continuously processing a blank in a transfer press. In the transfer press, a blank 11 (see FIG. 1) is first stamped out of a thin steel hoop material by the punch to have a circular center bolt hole 12 and the blank is then formed to a dish shape and simultaneously provided on one or the upper surface 13 thereof with six equally and circumferentially spaced triangular recesses 18 which are triangular as seen both in plan and cross-section as seen in FIGS. 2 through 5. As the result of forming the triangular recesses 18 in the upper contacting surface 13, lock pawls 15 corresponding to the recesses 18 in number, position and shape are formed on the lower contacting surface 14.

Thereafter, the thus processed blank is heat-treated to complete the conical spring washer 10.

The triangular lock pawls 15 on the lower contacting surface 14 are each comprised of a gradually sloped face 16 at an angle within the angle range 10°–45° with respect to the tightening direction of a nut or the head of a bolt and a sharply sloped face 17 at an angle within the angle range 60°–90° with respect to the loosening direction of the nut or bolt head.

Furthermore, the apices 19 of the lock pawls 15 are positioned nearer to the outer periphery rather than the inner periphery of the washer 10 as shown in FIG. 5. The apices 19 of the lock pawls 15 may be disposed at right angles to the lower contacting surface 14 as shown in FIG. 5 or may be disposed at right angles to the reference plane of the washer. The tightening direction of the nut or bolt head is shown by reference character A in FIG. 5.

Furthermore, the triangular lock pawls 15 shown in FIGS. 2 through 5 may be modified to form the lock pawls 20 shown in FIG. 6. Each of the modified lock pawls 20 on the lower contacting surface 14 has a gradually sloped face 21 and a sharply sloped face 22 in the same disposition as that of the corresponding parts of the previously described lock pawls 15. However, the tightening direction of the nut or bolt head is shown by reference character A in FIG. 6.

In the foregoing, description has been made of the case in which the conical washer 10 is formed in a transfer press, the washer may be formed in a progressive dies type press without departing from the scope of the invention.

The operation of the conical spring washer 10 will be now described referring to FIGS. 7 through 10.

Figure 8:
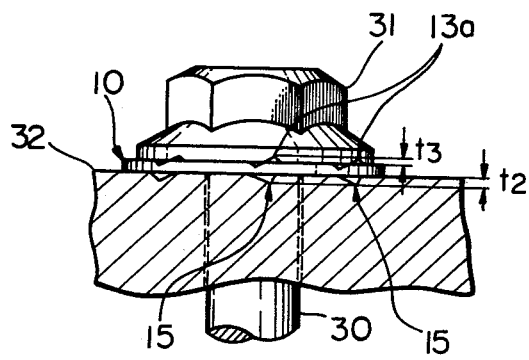

In FIGS. 7 and 8, the conical spring washer 10 is shown as being interposed between a flanged bolt 30 and a member 32 to be tightened. The apices 19 of the triangular lock pawls 15 on the lower contacting surface 14 extend outwardly from the reference plane of the washer by the distance $t_1$ and therefore, as the flanged bolt 30 is gradually tightened toward the member 32 to be fastened, the apices 19 of the lock pawls 15 bite into and elastically compress toward the member 32. At the completion of the tightening operation, the distance of the pawl apices 19 from the reference plane of the washer has been decreased to the value $t_2$.

On the other hand, although the recesses 18 on the upper contacting surface 13 of the washer 10 substantially do not interfere with the rotation of the bearing surface of the bolt 30 while the bolt is being tightened, the recesses 18 elastically push up the areas 13a on the upper contacting surface 13 which are positioned adjacent to the sharply sloped faces of the recesses 18 by the distance $t_3$ both in the final stage of the tightening operation and thereafter so that the bolt 30 is prevented from rotating in the loosening direction.

The locking effect of the conical spring washer 10 will be in detail described further.

The relationship between the necessary clamping force P (or axial force) for tightening a screw and the tightening torque T (referred to torque T hereinbelow) for obtaining the necessary clamping force P can be expressed as:

$$T = K \cdot D \cdot P \quad (1)$$

where
K: coefficient of torque
P: necessary clamping force
D: diameter of thread In the equation (1) referred to hereinabove, the coefficient of torque K is a function of the coefficient of friction at the interface between the screw and the adjacent face of the member to be tightened and, also, the coefficient by the lead and half angles of the thread, and has the following relationship:

$$K = K_1 + K_2 + K_3 \quad (2)$$

where
$K_1$: constant of friction between bearing surfaces
$K_2$: constant of friction between mating threads
$K_3$: constant relating to the axial force according the configuration of the screw thread and in general, these coefficients are:
$K_1$: 50%
$K_2$: 40%
$K_3$: 10%

As appreciated from the foregoing, the factor which affects the necessary torque T the most for obtaining the necessary clamping force P is $K_1$; that is, the frictional resistance at the contact area of the tightening bearing surfaces. It has been made clear that the roughness, hardness and material and the like of the threads and contact areas of bearing surfaces are quite complicated when observed microscopically and the value of the coefficient of torque K varies widely within the range from 0.100 to 0.350. This can be substantially equally applied to the case in which the washer is employed in conjunction with the screw.

In FIGS. 7 and 8 is shown one application of the conical spring washer 10 of the invention for tightening a member to be tightened in cooperation with a flanged bolt. In this case, the bolt 30 has a shank diameter of 10mm, a necessary clamping force of 4000kg (bolt strength of 110Kg/mm$^2$) and a flange diameter of 20mm; the washer 10 was made of a tempered carbon steel plate containing 0.6% of carbon and had a diameter of 22mm, a thickness of 1mm and a $t_1$ height of 0.3mm (the distance of the apices 19 of the lock pawls 15 from the reference plane of the washer); and the members to be tightened 32 were made of medium steel, cast iron, cast aluminum ($T_6$ treated) and cast duralumin for respective experimentation. The results of the application of the washer 10 as shown in FIGS. 7 and 8 are given in the diagrams of FIGS. 9 and 10 in terms of torque-tension relationship (axial force). In FIGS. 9 and 10, P: the clamping force (ton), $T_t$: the tightening torque (Kg-m) and $T_1$: the loosening force (Kg-m).

As clear from FIG. 9, although the conical spring washer 10 was employed for tightening members 32 to be tightened formed of different materials, the coefficient of tightening torque $K_t$ in all cases resulted in:

Coefficient of tightening torque $K_t = 0.242-0.255$

On the other hand, the results obtained by the tightening of members to be tightened formed of the different materials such as case iron, steel, cast aluminum ($T_6$ treated) and cast duralumin by using only the conventional flanged bolt without the washer of the invention are shown in terms of torque-tension (axial force) relationship for them. The coefficients of tightening torque $K_t$ for these members to be tightened are as follows:

$K_t$ of members formed of cast iron and steel = 0.180–0.215

$K_t$ of members formed of cast aluminum ($T_6$ treated) = 0.200–0.266

$K_t$ of members formed of cast duralumin = 0.180–0.350 (tightening was impossible)

Furthermore, when conventional flat washers and conical spring washers having the same diameter as that of the conical spring washer 10 of the invention, but having no lock pawls 15, are employed, the so-called "slip" rather frequently occurred between the contact surfaces of the conventional washers and members to be tightened and the coefficients of tightening torque sometimes fluctuated beyond the ranges of values referred to hereinabove.

And it was observed that the ratio of loosening torque to tightening torque $T_l/T_t$ was about 70%–80% for the conical spring washer 10 of the invention and 50%–60% for the conventional washers and this verifies that the conical spring washer 10 of the invention provides a great resistance to loosening.

It is, of course, possible that the conical spring washer 10 may be prepared by simply pressing a thin steel sheet or duralium for springs, copper alloy, stainless steel and the like, if required, and the dimensions of the conical spring washer of the invention are selectively designed depending upon the dimensions, strength, necessary clamping force and necessary bearing stress of the bolt employed in conjuncation with the conical spring washer of the invention as the case may be.

The lock pawls 15 on the conical spring washer 10 are usually disposed on the lower contacting surface 14 in a radially equally spaced relation and the number of such lock pawls is from 4 to 9, when the lock pawls 15 serve as effective mark means for controlling the tightening of bolts to nuts by the so-called rotation angle method. In other words, when six lock pawls 15 are provided on the lower contacting surface 14 in an equally and circumferentially spaced relation, the angular distance between adjacent lock pawls 15 is 60° and when the lock pawls 15 are disposed at different angular distances such as 30°, 60°, 90° and 120°, respectively, for example, the designed rotation angle can be simply detected.

While only one embodiment of the invention has been shown and described in detail it will be understood that the same is for illustration purpose only and not to be taken as a definition of the invention, reference being had for this purpose to the appended claims. What is claimed is:

1. A truncated conical spring lock-washer for fitting between a fastening device and a material through which said fastening device is fastened, said washer comprising:
  a conical spring lock-washer body having upper and lower contacting surfaces, said upper surface being substantially the same size as the underside of said fastening device and contactable thereby and said lower surface contacting said material; and
  a plurality of deformable lock pawl means extending downward from said lower contacting surface of said washer toward said material for engaging said material when said fastening device is tightened and for deforming and pushing areas of said pawl means upward to engage against said underside of said fastening device when said device is tightened, whereby said fastening device is engaged and prevented from loosening, each lock pawl means comprised of:
  a substantially triangular, inclined V-shaped depression in and extending beneath said lock-washer body having one gradually sloped face in the tightening direction of said fastening device, and a sharply sloped face in the loosening direction of said fastening device.

2. A truncated conical spring lock-washer as claimed in claim 1, wherein:
  said lock pawl means are circumferentially spaced around the lower contacting surface of said lock-washer body; and
  the apices of said V-shaped depressions are positioned adjacent the outer periphery of said lock-washer body.

3. A truncated conical spring lock-washer as claimed in claim 1, wherein said lock pawl means are disposed in an equally spaced relationship about the circumference of the lower surface of said lock-washer body.

4. A truncated conical spring lock-washer as claimed in claim 1, wherein:
  said gradually sloped face of said lock pawl means is formed at an angle of 10°–45° with respect to the tightening direction of said fastening device, and
  said sharply sloed face of said lock pawl means is formed at an angle of 60°–90° with respect to the loosening direction of said fastening device.

* * * * *